United States Patent
Kedem

(10) Patent No.: US 7,233,788 B2
(45) Date of Patent: Jun. 19, 2007

(54) RECOVERING FROM A DISCONNECTED PHONE CALL

(75) Inventor: Noam Kedem, Foster City, CA (US)

(73) Assignee: San Disk IL Ltd., Kfar Saba (IL)

( * ) Notice: Subject to any disclaimer, the term of this patent is extended or adjusted under 35 U.S.C. 154(b) by 323 days.

(21) Appl. No.: 10/961,048

(22) Filed: Oct. 12, 2004

(65) Prior Publication Data

US 2006/0019650 A1 Jan. 26, 2006

Related U.S. Application Data

(60) Provisional application No. 60/589,206, filed on Jul. 20, 2004.

(51) Int. Cl.
H04M 7/22 (2006.01)
H04M 3/42 (2006.01)
H04Q 7/22 (2006.01)

(52) U.S. Cl. .............. 455/414.1; 455/404.1; 455/412.2

(58) Field of Classification Search ........... 455/404.1, 455/412.1, 412.2, 414.1, 423, 450, 435.1, 455/435.3, 67.11, 421, 445
See application file for complete search history.

(56) References Cited

U.S. PATENT DOCUMENTS

| | | | | |
|---|---|---|---|---|
| 5,752,185 A | * | 5/1998 | Ahuja | 455/414.1 |
| 6,032,040 A | * | 2/2000 | Choy et al. | 455/414.1 |
| 6,240,284 B1 | * | 5/2001 | Bugnon et al. | 455/404.1 |
| 6,343,216 B1 | * | 1/2002 | Kim et al. | 455/450 |
| 6,445,918 B1 | * | 9/2002 | Hellander | 455/423 |
| 6,633,760 B1 | * | 10/2003 | Ham et al. | 455/422.1 |
| 6,745,031 B2 | * | 6/2004 | Chun et al. | 455/435.1 |
| 6,990,349 B1 | * | 1/2006 | Idrissi | 455/450 |
| 7,072,641 B2 | * | 7/2006 | Satapathy | 455/412.1 |
| 2004/0077331 A1 | * | 4/2004 | King | 455/405 |
| 2004/0157606 A1 | * | 8/2004 | Lee | 455/435.1 |
| 2004/0203645 A1 | * | 10/2004 | Forman et al. | 455/414.1 |
| 2004/0235509 A1 | * | 11/2004 | Burritt et al. | 455/519 |

OTHER PUBLICATIONS

U.S. Appl. No. 10/893,334—Filed on Jul. 19, 2004 "Directed Messaging".

* cited by examiner

Primary Examiner—Sonny Trinh
(74) Attorney, Agent, or Firm—Mark M. Friedman

(57) ABSTRACT

A method for handling an interruption of a telephone call in a mobile telephone network between a first user of a first telephone and a second user of a second telephone. The method includes detecting the onset of an interruption in a telephone connection. The detection is performed either manually by the first user or autonomously by the first telephone. When an onset of interruption is detected, a message is recorded and sent from the first user to the second user. The recording is performed either in a mobile telephone or in a server for handling interrupted calls.

12 Claims, 3 Drawing Sheets

RECOVERING FROM A DISCONNECTED PHONE CALL

CROSS REFERENCE TO RELATED APPLICATIONS

This application claims the benefit from U.S. provisional application 60/589,206 filed 20 Jul. 2004 by the present inventor.

FIELD AND BACKGROUND OF THE INVENTION

The present invention relates to call connections in a telecommunications network, and in particular to handling dropped calls in the mobile telecommunications environment.

Cellular telecommunications systems rely on a physical radio link for communications between a fixed base station and a mobile user. A weak signal accompanied by noise and/or distortion, e.g. low signal to noise ratio, in the radio link between the base transceiver station (BTS) and the mobile station frequently results in dropped calls. The communication is eventually terminated because of an inability of the base transceiver station (BTS) and mobile station to communicate with one another. Such radio link failures can be due to, for example, a mobile station entering a region with poor radio coverage, e.g. tunnel, unsuccessful handoff of the mobile communication between different base stations, radio interference from other mobile stations, multipath interference due to multiple radio reflections, unreliable battery connections, and other failures related to software or hardware in the base station.

One of the primary problems with dropped calls is that dropped calls inconvenience mobile telephone users by requiring them to call again, which can result in user dissatisfaction. Furthermore, if dropped calls occur frequently, users may be more reluctant to use their mobile telephones, effectively reducing the amount of revenue that the mobile telecommunication service provider generates.

In most cases, when a call is dropped, no effort is made to recover from the lost connection. Instead, the user of the mobile station must reinitiate the call.

Some solutions for reconnecting involuntarily disconnected calls have been proposed. Industry standard TIA/J-STD-034 describes a proposed solution for connecting dropped emergency calls. The proposed solution, however, is network initiated and involves the network establishing a new connection with the mobile station by calling the mobile station if the call is dropped. One of the main drawbacks of this proposed solution is that, after the network detects that the connection to the mobile station has been lost, the network waits until the mobile station becomes idle and returns to the control channel (i.e., when the user pushes the "on-hook" button on the mobile station) before it can initiate the call back procedure. Then, the mobile station can be paged as a normal call, and the user will receive a ring tone and will have to manually answer the new call. An additional drawback of this proposed solution is that, if the mobile station is no longer within the same coverage area, the network probably will not be able to locate the mobile station to place the new call.

Hellander, U.S. Pat. No. 6,445,918 proposes detecting at the mobile station a radio path loss of a call involving the mobile station; selecting a target cell based on signal quality measurement; transmitting a call reconnect request from the mobile station to the target cell; requesting an identification of a serving switching node involved in the call from a remote database in response to the call reconnect request; and reconnecting the mobile station to the call in response to the call reconnect request. The call reconnect request is sent via a control channel of a target communication station. The control channel and/or its associated target communication station are selected from a neighboring cell list received by the mobile station. In response to the call reconnect request, the network reconnects the mobile station to the call using a radio channel of the target communication station. Hellendar, however, does not disclose a method for handled disconnected call when all base transceiver stations neighboring a mobile station of the disconnected communication have significant path loss to the mobile station, e.g. if the mobile station enters an area of poor coverage.

There is a thus a need and it would be highly advantageous to have, a method and system for handling dropped connections with a mobile telephone within a mobile telecommunications network when the mobile telephone enters an area of poor coverage.

SUMMARY OF THE INVENTION

U.S. patent application Ser. No. 10/893,334, entitled "Directed Messaging", discloses a system and method for directing time critical messages to an intended recipient in a mobile telephone communications network. The present invention includes directed messaging in a situation that an interruption in a telephone call is detected or imminent.

According to the present invention there is provided a method for handling an interruption of an ongoing telephone call between a first telephone in use by a first user and a second telephone in use by a second user, the method including: (a) monitoring for an onset of the interruption and upon detecting the onset of the interruption, recording a message from the first user for the second user and sending the message for the second user. Preferably, the detecting is performed autonomously by the first telephone. Alternatively, the first user participates in the detecting. Preferably, the first user initiates the recording; alternatively the recording is initiated by the first telephone. Preferably, the sending of the message is performed autonomously by the first telephone; alternatively the first user upon completion of the recording initiates sending of the message. Preferably, the sending of the message occurs when the second mobile telephone becomes available to the mobile telephone network. Preferably the method further includes (d) recording a second message from the first user for the second user; and (e) sending the second message to the second user, appending the second message to the message. Preferably, the detecting of the onset of an interruption is performed by mobile communications equipment operatively connected to the first and second telephones and upon detecting the onset of an interruption, the mobile communications equipment initiates recording of the message. Preferably, the initiating includes transferring the telephone call to a handle-dropped call server operatively connected to the mobile communications equipment. Preferably, the recording is performed by a handle-dropped-call server operatively connected to the mobile communications equipment and upon completion of the recording of the message, sending of the message is initiated by a handle-dropped-call server operatively connected to the mobile communications equipment.

According to the present invention there is provided a telephone including: (a) a processor; and (b) a detection mechanism for detecting an onset of an interruption of an ongoing telephone call with another party. The processor is programmed so that upon the detecting the onset, the processor records a message for the other party. Preferably, the telephone further includes a memory and the recording includes storing the message in the memory.

According to the present invention there is provided a telephone including a detection mechanism for detecting an onset of an interruption of an ongoing telephone call with another party; processor programmed for recording a message for the other party; and an input mechanism for initiating the recording. Preferably, the telephone further includes a memory for storing the message.

According to the present invention there is provided a telephone including a user interface operative to offer at least one option selected from the group consisting of:

(i) upon detection of an onset of an interruption of a telephone connection with another party, initiate recording of a first message; and (ii) record and append a second message to said first message. The user interface offers a plurality of further options including (i) initiate recording of the first message, (ii) play the first message for review; and (iii) send the first message to other party.

According to the present invention there is provided a method for recovering from an interrupted call between a first mobile telephone and a second mobile telephone, in a mobile telephone network, wherein a link to the second mobile telephone is interrupted, the method including: (a) receiving the call from the first mobile telephone by mobile communications equipment installed in the mobile telephone network; and (b) upon the receiving, storing a message from the first mobile telephone intended for a user of the second mobile telephone. Preferably, the method further includes (c) sending the message to a user of the second mobile telephone preferably when the second mobile telephone becomes available to the mobile telephone network.

According to the present invention there is provided a server for recovering from an interrupted call between a first mobile telephone and a second mobile telephone, in a mobile telephone network, the server operationally connected to a mobile switching center, the mobile switching center operatively connected to the first mobile telephone, wherein a link to the second mobile telephone is interrupted, the server including: (a) a processor for receiving the call from the first mobile telephone; (b) a memory; wherein upon detecting an onset of the interruption, the processor receives the call and stores in the memory a message from the first mobile telephone intended for a user of the second mobile telephone.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
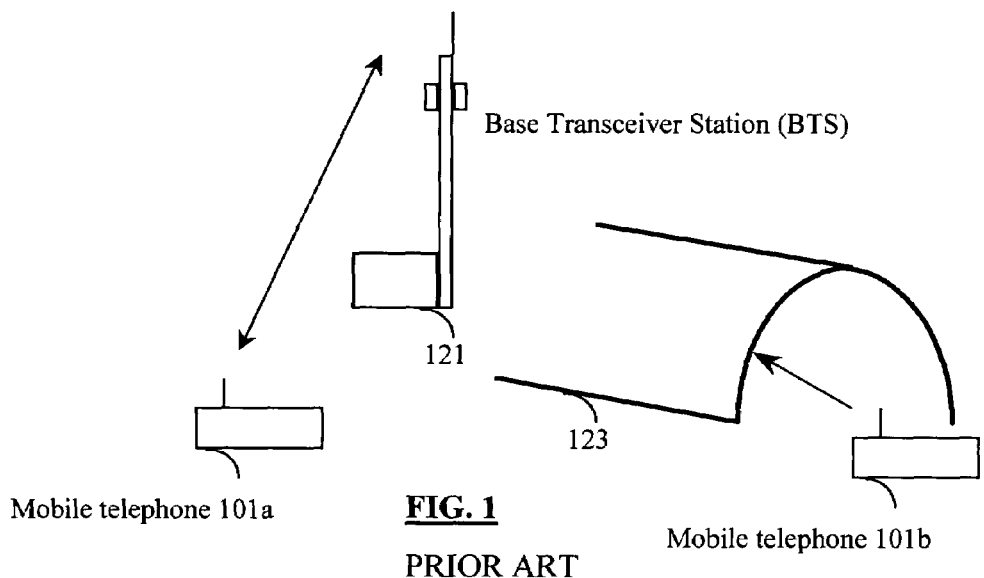
FIG. 1 is a simplified prior art drawing of a showing a dropped mobile connection.

The present invention is of a system and method for handling a disconnected mobile telephone call.

The principles and operation of a system and method of for handling a disconnected mobile telephone call, according to the present invention, may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

By way of introduction, the principal intentions of the present invention are to handle a dropped connection between two users by recording a message by one user for the second user on the onset of an interruption and after the interruption, send the recorded message to the second user when the mobile telephone of the second user becomes available. The present invention includes a detection mechanism to detect the deterioration of the connection, i.e. the onset of an interruption. The phrase "on the onset of an interruption" includes in addition to the actual loss of connection, a short period of time before the moment of losing the connection if the loss of connection is predictable by the detection mechanism. The detection mechanism for detecting the onset of an interruption is included in the mobile telephone, or in mobile communications equipment as part of a base transceiver station or a mobile switching center. The phrase "for the second user" refers to a message sent "to the second user" or a message sent, for instance, to the voice mailbox of the second user.

It should be noted that while the discussion herein is directed to a public cellular mobile network, the principles of the present invention may be adapted for use in, and provide benefit for other types of wireless communications including private wireless networks, iDEN (MIRS), paging services, and satellite communications. Further the mechanism for storing voice messages may be of any such mechanisms known in the art, including analog media, and digital storage media including random access memory, flash memory, and EEPROM. The terms "storage" and "memory" are used herein interchangeably and refer to any such storage mechanisms.

Referring now to the drawings, FIG. 1 illustrates a typical scenario (hereinafter Scenario 1) of a dropped connection in a prior art mobile data network. A user, Ron using a prior art mobile telephone 101a is currently speaking with a second user, Harry using a second prior art mobile telephone 101b. Harry is in a motor vehicle about to enter a region of poor cellular coverage, e.g. tunnel 123. Ron's telephone 101a, however, has a high quality radio link with a base transceiver station 121 of the mobile data network. Ron has just finished saying, "Harry listen carefully, this is very important . . . " and the connection drops at Harry's end because of poor cellular coverage in tunnel 123. Unfortunately, Harry never heard the end of Ron's sentence. In the meantime, Ron has finished the sentence and has continued speaking before he realized that the connection has dropped. When Harry finally travels out of the tunnel, e.g. after about 10 minutes and mobile telephone 101b is available to the mobile telephone network, Harry using mobile telephone 101b attempts to establish another call with Ron by calling mobile telephone 101*a*. Harry then finds that (Ron's) mobile telephone 101*a* is now not available.

Figure 2:
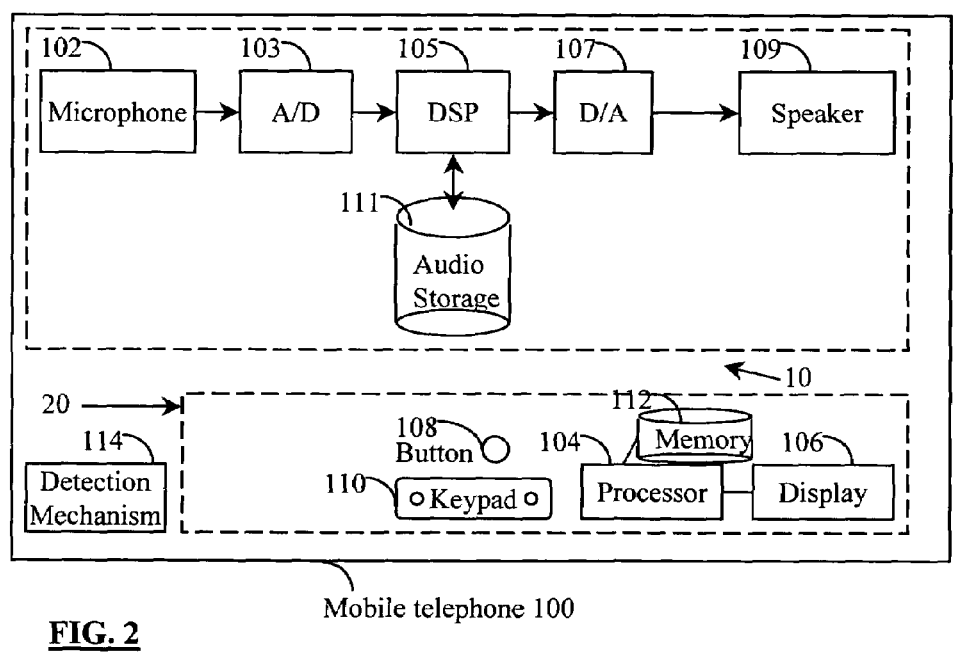
FIG. 2 is a schematic drawing of a mobile telephone, according to an embodiment of the present invention.

Reference is now made to FIG. 2, of a mobile telephone 100 in accordance with an embodiment of the present invention. FIG. 2 illustrates a sub-system 10 for storing and listening to voice messages using mobile telephone 100. Mobile telephone 100 includes a microphone 102 for converting a voice to an electrical signal. Mobile telephone 100 further includes an analog to digital converter (A/D) 103 operatively connected to microphone 102. Intermediary stages for analog amplification and filtering found in mobile telephone 100 after microphone 102 are not shown in FIG. 2. Mobile telephone 100 further includes a digital signal processor (DSP) 105, for compressing, encoding and further processing the digital data representing the audio signal as received in microphone 102. Sub-system 10 for storing messages in mobile telephone 100 further includes an audio storage 111. Mobile telephone 100 includes a digital to analog converter (D/A) 107 operatively connected to a speaker 109. Intermediary stages found in mobile telephone 100 for amplification between D/A 107 and speaker 109 are not shown in FIG. 2. Mobile telephone 100 further includes a a detection mechanism, e.g. received signal strength indicator (RSSI) 114 that detects the integrity of the physical radio link to base transceiver station 121.

Mobile telephone 100 further includes a user interface 20 including a display 106, an input mechanism, e.g. a keypad 110, a processor 104 and a memory 112 for storing software instructions to be run by processor 104. Mobile telephone 100 further includes a button 108, used for instance to record messages. The term "button" is defined herein to refer to any input mechanism to user interface 20 of mobile telephone 100, including a physical button, or an icon on display 106. The terms "button" and input mechanism are used herein interchangeably.

Figure 3:
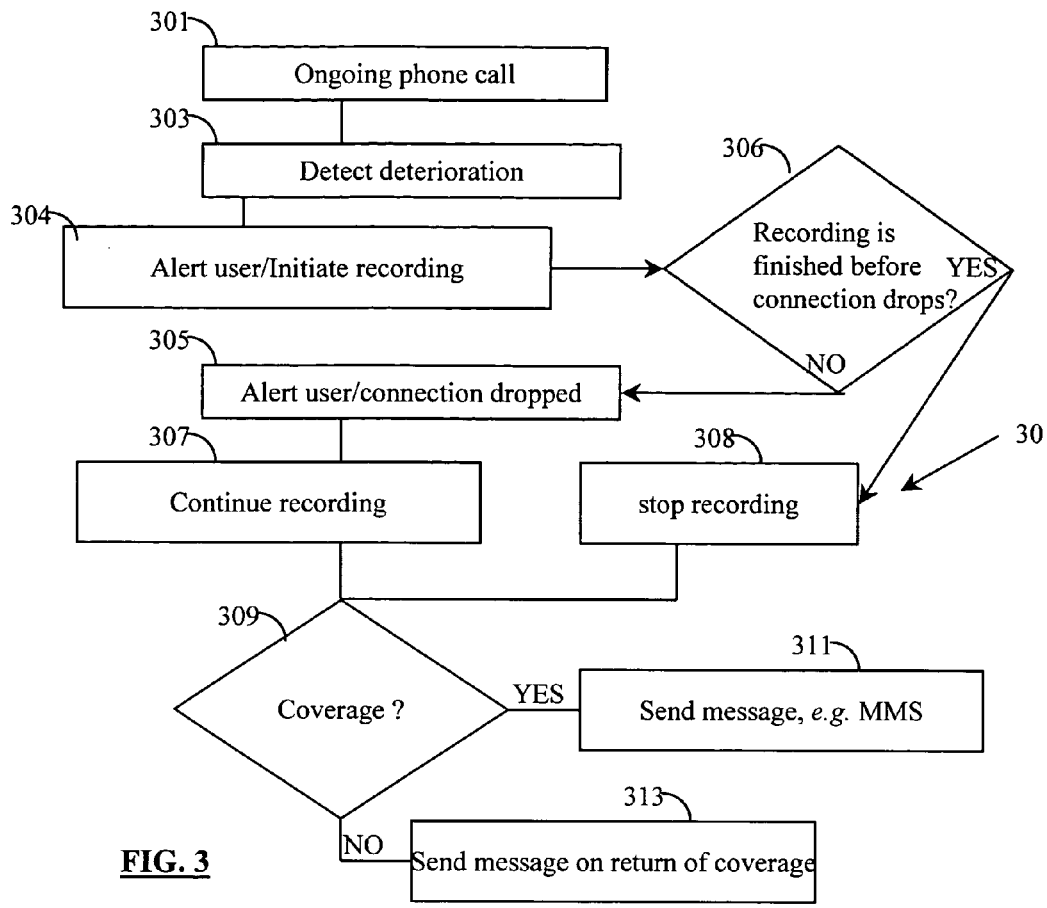
FIG. 3 is a flow diagram of a process operational with the embodiment of FIG. 2.

The operation of mobile telephone 100, according to an embodiment of the present invention is shown in FIG. 3. Returning to Ron and Harry of Scenario 1, Ron is now equipped with a mobile telephone 100 according to an embodiment of the present invention. During an ongoing telephone conversation (step 301), a deterioration of signal strength is detected (step 303) predicting the onset of a dropped call. The deterioration of signal strength is detected for instance by BTS 121 in communication with Harry's telephone 101*b* using for instance a signal strength monitor. BTS 121 signals to Ron's telephone 100 that the BTS connection with Harry's telephone is on the onset of an interruption. Ron's telephone detects (step 303) automatically, e.g. with detection mechanism 114, the signal indicating the onset of a dropped call. Alternatively, the user, e.g. Ron using detection mechanism 114 notices the onset of a dropped connection at Harry's end. Alternatively, Ron audibly detects poor signal quality and therefore anticipates the onset of a dropped call. Mobile telephone 100 initiates recording automatically for instance when any such mechanism detects the onset of a dropped connection. Preferably, Ron is alerted by mobile telephone 100, such as with a tone from speaker 109 indicating that the onset of a dropped call is predicted (step 303) and the recording a message for Harry is initiated (step 304). Alternatively the user, Ron, hears poor signal quality (step 303) and using user interface 20, Ron chooses to initiate recording (step 304). Recording continues until the connection between mobile telephone 100 and BTS 121 is dropped (step 305). Preferably, the telephone alerts Ron, e.g. speaker 109 emits a tone, when the connection drops. If Ron hasn't finished recording a message for Harry before the connection drops (decision block 306), Ron has the option to append a continuation onto the recorded message and continue recording (step 307) Alternatively, if Ron finishes recording (step 304) and the call hasn't dropped (decision block 306); Ron using user interface 20 instructs mobile telephone 100 to stop recording (step 308). Mobile telephone 100 preferably sends Ron's recorded message automatically for instance using a multimedia message service (MMS). Alternatively, Ron sends (step 311) the message with an instruction to mobile telephone 100 using user interface 20.

Described below is Scenario 2, a different Scenario from Scenario 1 described above. Scenario 2 is similar to Scenario 1, as shown in FIG. 1 with two differences; (1) Harry is also equipped with mobile telephone 100 according to an embodiment of the present invention, and (2) Harry is speaking when he enters tunnel 123 and he wants to leave a message for Ron. Referring again to FIG. 3, Harry is speaking to Ron during an ongoing phone call (step 301). The onset of the dropped call is detected (step 303) either by Harry looking at detection mechanism 114, e.g. RSSI indicator on telephone 100 or telephone 100 autonomously detects (step 303) the onset of a dropped connection. A recording for Ron is initiated (step 304) either by Harry by pushing a button on user interface 20 or autonomously by the telephone. If the connection drops (step 305), and the recording is not finished (decision block 306) then Harry has the option to continue recording. (step 307) Harry needs to wait until coverage has returned and communications are available (decision block 309), e.g. Harry is out of the tunnel. If communications are available Harry can send his message, e.g. MMS to Ron with an instruction to mobile telephone 100 (step 311) using user interface 20. Alternatively, mobile telephone 100 is previously instructed to poll for return of coverage and when communications are available, send the message automatically to Ron (step 313).

Figure 4:
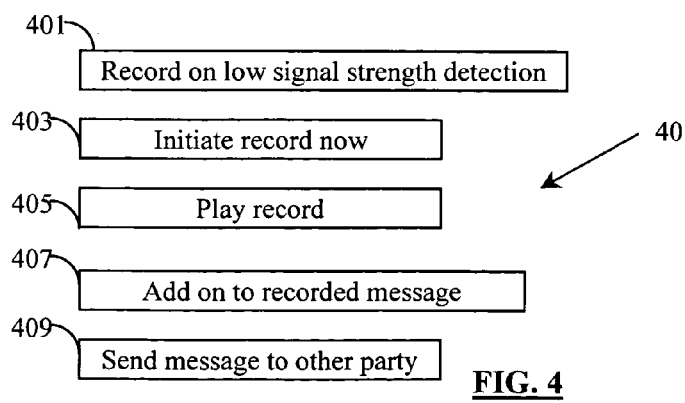
FIG. 4 is a menu structure of a mobile telephone, according to the embodiment shown in FIG. 2.

Reference is now made to FIG. 4 showing options available in user interface 20 for recovering from a disconnected call. Option 401 instructs mobile telephone 101 to use detection mechanism 114 to detect, i.e. predict, the onset of a dropped call and upon detection, initiate recording of a voice message. Option 403 initiates recording of a message for a specific mobile telephone user. Option 405 requests the mobile telephone 100 to play, for reviewing, a previously recorded message using, for instance, speaker 109 before sending (step 311) the message. Option 407 requests mobile telephone 100 to record a second message as a continuation to a first previously recorded message and append the second message to the first message. Option 409 requests the telephone to send the recorded message to the other party.

Figure 5:
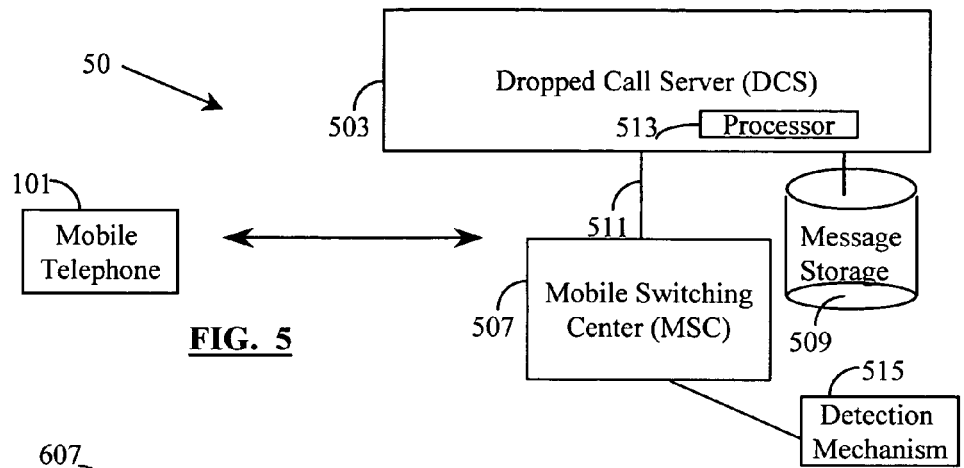
FIG. 5 is simplified drawing of a system for recovering from a disconnected connection according to an embodiment of the present invention.
Figure 6:
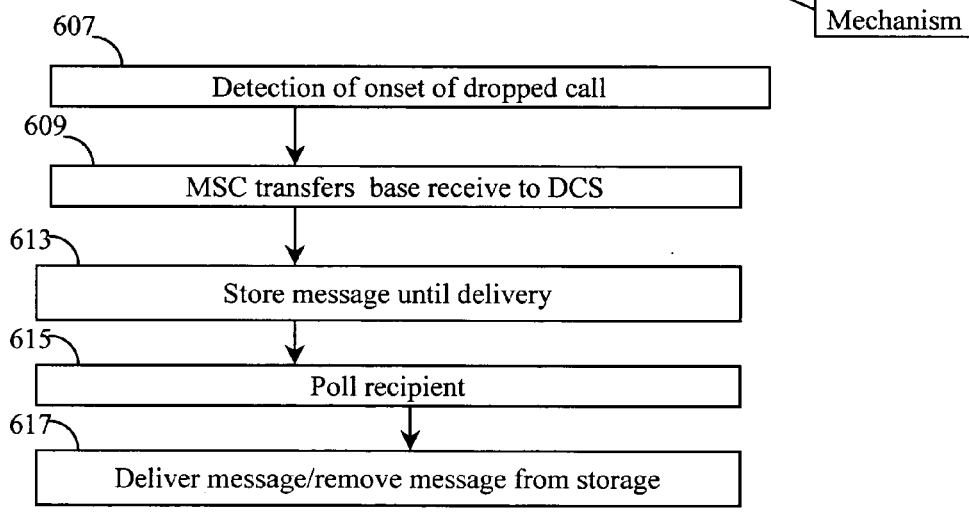
FIG. 6 is a flow diagram of a process operational with the system of FIG. 5.

Another possible configuration 50 for the present invention is shown in FIG. 5. FIG. 5 illustrates prior art mobile telephone 101 in communication with a mobile switching center (MSC) 507 as part of, for instance, a public mobile telephone network. Mobile switching center (MSC) 507 is operatively connected, e.g. by a wireless or wired connection, to a dropped call server (DCS) 503 including a processor 513 and an interface 511 with MSC 507. DCS 503 is operatively connected to DCS message storage 509. A detection mechanism 515, e.g. RSSI, part of the mobile communications equipment is operatively connected to MSC 507 for detecting the onset of an interruption. The operation of configuration 50 is best described by returning to the example of Scenario 1 of Harry and Ron. Referring also to FIG. 6 illustrating the process of handling a dropped connection, detection mechanism 515 detects (step 607) deterioration in the signal quality of the connection with Harry. Alternatively BTS 121 operatively connected to MSC 507 detects (step 607) the signal deterioration. MSC 507 on receiving a signal indicating the onset of a dropped connection with Harry, transfers (step 609) the base receive audio signal intended for Harry from (Ron's) mobile telephone 101*a* to DCS 503. DCS 503 using processor 513 stores (step 613) the audio signal from Ron to Harry in message storage 509. DCS 503 polls (step 615) (Harry's) mobile telephone 101*b*. When (Harry's) mobile telephone 101*b* is available, DCS 503 delivers (step 617) Ron's final words as a message, e.g. MMS to Harry. Harry acknowledges receipt of the message, "Harry listen carefully, this is very important there has been a change of plans—your flight is delayed, take the train to London." After successfully delivering the message, the message is then removed from message storage 509.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is important, therefore, that the claims be regarded as including such equivalent constructions insofar as they do not depart from the spirit and scope of the present invention.

While the invention has been described with respect to a limited number of embodiments, it will be appreciated that many variations, modifications and other applications of the invention may be made.

What is claimed is:

1. A method for handling an interruption of an ongoing telephone call between a first telephone in use by a first user and a second telephone in use by a second user, the method comprising the steps of:
    (a) monitoring for an onset of the interruption;
    (b) upon detecting said onset, recording a message from the first user for the second user; wherein said detecting is performed by mobile communications equipment operatively connected to the first telephone and to the second telephone;
    (c) upon said detecting, initiating said recording by said mobile communications equipment; wherein said initiating includes transferring the telephone call to a handle-dropped-call server operatively connected to said mobile communications equipment; and
    (d) sending the message for the second user.

2. The method, according to claim 1, wherein the first user participates in said detecting.

3. The method, according to claim 1, wherein said sending is initiated when the second telephone becomes available to the mobile telephone network.

4. The method, according to claim 1, further comprising the steps of:
    (e) recording a second message from the first user for the second user; and
    (f) sending said second message to the second user, thereby appending said second message to said first message.

5. The method, according to claim 1, wherein said recording is performed by handle-dropped-call server operatively connected to said mobile communications equipment.

6. The method, according to claim 1, wherein said sending is initiated by handle-dropped-call server operatively connected to said mobile communications equipment.

7. A method for recovering from an interrupted connection between a first mobile telephone and a second mobile telephone, in a mobile telephone network, when a link between the mobile telephones is interrupted, the method comprising the steps of:
    (a) receiving the connection from the first mobile telephone, by a handle-dropped-call server installed in the mobile telephone network; and
    (b) upon said receiving, storing a message from the first mobile telephone intended for a user of the second mobile telephone, wherein said storing a message is performed by said handle-dropped-call server.

8. The method, according to claim 7, further comprising the step of:
    (c) sending said message to said user of the second mobile telephone, wherein said sending is performed by said handle-dropped-call server.

9. The method, according to claim 8, wherein said sending is initiated when the second mobile telephone becomes available to the mobile telephone network.

10. A handle dropped call server which the performs method steps of claim 7.

11. A server for recovering from an interrupted call between a first mobile telephone and a second mobile telephone in a mobile telephone network when a link between the telephones is interrupted, the server operationally connected to a mobile switching center, the mobile switching center operatively connected to the first mobile telephone, the server comprising:
    (a) a processor for receiving the call from the first mobile telephone; and
    (b) a memory;
wherein upon detecting an onset of the interruption, said processor receives the call and stores in said memory a message from the first mobile telephone intended for a user of the second mobile telephone.

12. A method for handling an interruption of an ongoing telephone call between a first telephone in use by a first user and a second telephone in use by a second user, the method comprising the steps of:
    (a) monitoring for an onset of the interruption;
    (b) upon detecting said onset, recording a first message portion from the first user for the second user;
    (c) providing an option to the first user to append a second message portion to the first message portion;
    (d) recording said second message portion by the first user; and
    (e) sending a message to the second user, said message including said second message portion appended to said first message portion.

* * * * *